United States Patent
Norp et al.

(10) Patent No.: US 9,699,820 B2
(45) Date of Patent: *Jul. 4, 2017

(54) ESTABLISHING A DEVICE-TO-DEVICE COMMUNICATION SESSION

(71) Applicants: Koninklijke KPN N.V., The Hague (NL); Nederlandse Organisatie voor Toegepast-Natuurwetenschappelijk Onderzoek TNO, The Hague (NL)

(72) Inventors: Antonius Norp, The Hague (NL); Frank Fransen, Zuidhorn (NL); Sander De Kievit, Leiden (NL)

(73) Assignees: KONINKLIJKE KPN N.V., The Hague (NL); NEDERLANDSE ORGANISATIE VOOR TOEGEPAST-NATUURWETENSCHAPPELIJK ONDERZOEK TNO, Den Haag (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,742

(22) Filed: Aug. 10, 2016

(65) Prior Publication Data

US 2016/0353505 A1    Dec. 1, 2016

Related U.S. Application Data

(63) Continuation of application No. 14/424,691, filed as application No. PCT/EP2013/067904 on Aug. 29, 2013, now Pat. No. 9,438,572.

(30) Foreign Application Priority Data

Sep. 6, 2012 (EP) ..................... 12183256

(51) Int. Cl.
*H04L 29/06* (2006.01)
*H04W 76/02* (2009.01)
(Continued)

(52) U.S. Cl.
CPC ......... *H04W 76/023* (2013.01); *H04L 63/061* (2013.01); *H04L 63/062* (2013.01);
(Continued)

(58) Field of Classification Search
USPC .............................................. 726/4
See application file for complete search history.

(56) References Cited

U.S. PATENT DOCUMENTS 8,902,855 B2    12/2014   Etemad
9,438,572 B2     9/2016   Norp et al.
(Continued)

FOREIGN PATENT DOCUMENTS

JP    2002 290397    10/2002
JP    2005 244534     8/2005
(Continued)

OTHER PUBLICATIONS

"Security Analysis and Enhancements of 3GPP Authentication and Key Agreement Protocol"; M Zhang et al;9 pages;IEEE 2005.*
(Continued)

*Primary Examiner* — Jason Lee
(74) *Attorney, Agent, or Firm* — Hamilton, Brook, Smith & Reynolds, P.C.

(57) ABSTRACT

A method is disclosed for establishing a device-to-device communication session between mobile devices which are mutually connectable via a D2D communication channel (DDC) and individually connectable to a mobile network (MN), including preloading an initiation key on each of the mobile devices, the initiation key being associated with a validity period; and on each of the mobile devices: verifying a validity of the initiation key based on a current time; if the initiation key is deemed valid, generating a session key using the initiation key by using the initiation key in performing a key agreement procedure between the mobile
(Continued)

devices over the D2D communication channel (DDC), the key agreement procedure resulting in the session key if the initiation key used by each of the mobile devices matches; and establishing the D2D communication session over the D2D communication channel (DDC) based on the session key.

17 Claims, 5 Drawing Sheets

(51) Int. Cl.
    *H04W 12/04*     (2009.01)
    *H04L 29/08*     (2006.01)
    *H04W 12/06*     (2009.01)
    *H04W 72/12*     (2009.01)
    *H04W 92/18*     (2009.01)

(52) U.S. Cl.
    CPC ........... *H04L 67/141* (2013.01); *H04W 12/04* (2013.01); *H04W 12/06* (2013.01); *H04W 72/1215* (2013.01); *H04L 63/0853* (2013.01); *H04W 92/18* (2013.01)

(56) References Cited

U.S. PATENT DOCUMENTS

| | | | |
|---|---|---|---|
| 9,444,851 | B2 | 9/2016 | Fransen et al. |
| 2006/0258383 | A1 | 11/2006 | Jiang et al. |
| 2007/0253376 | A1 | 11/2007 | Bonta et al. |
| 2009/0320102 | A1 | 12/2009 | Ou |
| 2011/0194460 | A1 | 8/2011 | Witzel et al. |
| 2011/0252144 | A1 | 10/2011 | Tung et al. |
| 2013/0013926 | A1 | 1/2013 | Hakola et al. |
| 2013/0054967 | A1 | 2/2013 | Davoust et al. |
| 2013/0094638 | A1 | 4/2013 | Anchan |
| 2013/0227655 | A1 | 8/2013 | Vanderveen et al. |
| 2014/0067987 | A1 | 3/2014 | Agrawal et al. |
| 2015/0222612 | A1 | 8/2015 | Norp et al. |
| 2015/0288724 | A1 | 10/2015 | Fransen et al. |

FOREIGN PATENT DOCUMENTS

| | | |
|---|---|---|
| JP | 2006 238273 | 8/2006 |
| JP | 2006 253837 | 9/2006 |
| JP | 2008 539643 | 11/2008 |
| JP | 2009 512296 | 3/2009 |
| JP | 2011 147148 | 7/2011 |
| JP | 2012 502587 | 1/2012 |
| WO | WO 2010/030515 | 3/2010 |
| WO | WO 2010/150813 | 12/2010 |
| WO | WO 2011/117677 | 9/2011 |
| WO | WO/2014/037277 | 3/2014 |
| WO | WO 2014/067875 A1 | 5/2014 |

OTHER PUBLICATIONS

"Anonymously multi-party communication interception," Institute for Information Industry (III), TSG-SA WG1 Meeting #57, Kyoto, Japan (Feb. 2012).

"Lawful Interception for 3G and 4G Networks," Jan. 31, 2012, Retrieved from the Internet: URL:http://www.aqsacom.com/resources/pdf/Li-3G-4G-White.pdf.

"Proximity aware service consideration on lawful interception," Institute for Information Industry (III), TSG-SA WG1 Meeting #57, Kyoto, Japan (Feb. 2012).

3GPP TSG-SA WG1 Meeting #57, "Proximity Aware Service Consideration on Lawful Interception", Kyoto Japan, Feb. 17, 2012.

3$^{rd}$ Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300, V11.3.0 (Sep. 2012).

3$^{rd}$ Generation Partnership Project; Technical Specification Group Services and Systems Aspects; 3G security; Lawful interception architecture and functions (Release 11), 3GPP TS 33.107 V11.3.0 (Sep. 2012).

3$^{rd}$ Generation Partnership Project; Technical Specification Group Services and System Aspects; Service requirements for the Evolved Packet Systems (EPS) (Release 11), 3GPP TS 22.278 V11.6.0 (Sep. 2012).

Fodor, G., et al., "Design Aspects of Network Assisted Device-to-Device Communications," *IEEE Communications Magazine*, pp. 170-177, Mar. 2012.

"Security Analysis and Enhancements of 3GPP Authentication and Key Agreement Protocol," M. Zhang et al., Wireless Communications, IEEE Transactions on, 2005, 9 pages.

Non-Final Office Action for U.S. Appl. No. 14/438,786, mailed on Oct. 2, 2015.

Non-Final Office Action for U.S. Appl. No. 14/424,691, mailed on Dec. 10, 2015.

Notice of Allowance U.S. Appl. No. 14/424,691, mailed on May 11, 2016.

Notification of Transmittal of the International Search Report and the Written Opinion of the International Searching Authority, PCT/EP2013/067904, date of mailing Oct. 7, 2013.

Notice of Allowance for U.S. Appl. No. 14/438,786, Mailed: Mar., 30, 2016.

Notice of Allowance for U.S. Appl. No. 14/438,786, Mailed: Jun. 28, 2016.

* cited by examiner

ESTABLISHING A DEVICE-TO-DEVICE COMMUNICATION SESSION

RELATED APPLICATIONS

This application is a continuation of U.S. application Ser. No. 14/424,691, filed on Aug. 29, 2013, which is the U.S. National Stage of International Application No. PCT/EP2013/067904, filed on Aug. 29, 2013, which designates the U.S., published in English, and claims priority under 35 U.S.C. §§119 or 365(c) to European Application No. 12183256.2, filed Sep. 6, 2012. The entire teachings of the above applications are incorporated herein by reference.

FIELD OF THE INVENTION

The invention relates to a method for establishing a device-to-device (D2D) communication session between mobile devices. The invention further relates to a mobile device for establishing the D2D communication session with a further mobile device. The invention further relates to control software comprising instructions for execution on the mobile device. The invention further relates to the mobile network.

Mobile communication networks, also referred to as cellular networks or mobile networks, have been extensively deployed over the last decades in order to address the increasing need for mobile communication. Communication between mobile devices which are connected to such a mobile network typically takes place via the mobile network, i.e., via one or more base stations and core nodes of the mobile network.

BACKGROUND OF THE INVENTION

It is desirable to enable mobile devices which are typically connected to a mobile network to also directly communicate with each other, i.e., via so-termed device-to-device (D2D) communication.

D2D communication is characterized by a direct wireless communication path between two mobile terminals, such as the mobile devices, while maintaining, at least at some moments in time, at least a signaling connection with/via a base station of the wireless communication network, i.e., of the mobile network. The direct wireless communication path between mobile terminals allows to offload the base station(s), the access network and the core network of the wireless communication network from most of the data and signaling exchanged between the mobile terminals. The signaling connection with (a base station of) the wireless communication network allows the wireless communication network to control the resources assigned to the direct communication path between the terminals.

A mobile device which, at a given time, uses D2D communication instead of communicating via the mobile network may be referred to as operating in Direct Mode Operation (DMO). DMO offers advantages such as, e.g., enabling mobile communication between users outside a range of the mobile network, reducing of load from the base stations and/or from the core nodes of the mobile network, etc.

An example of a mobile communication standard which enables mobile communication between mobile devices both via the mobile network as well as via the aforementioned D2D communication is Terrestrial Trunked Radio (TETRA).

Another example of such a mobile communication standard is Global System for Mobile Communications (GSM). The GSM standard includes a so-termed local call, local switch feature in which mobile communication between mobile devices which are connected to a same base station of the mobile network is not routed through the core nodes of the mobile network, but rather directly from the base station to each respective mobile device.

Yet another example is Long Term Evolution (LTE). Recent developments in LTE include D2D communication between mobile devices. It is noted that in the context of LTE, such D2D communication is also referred to as Direct LTE.

SUMMARY OF THE INVENTION

A problem of the above mobile networks and mobile devices is that an operator of the mobile network has no or only limited control over the D2D communication. The inventors have recognized that such control is desirable for various reasons. For example, the D2D communication may take place in a frequency spectrum which is licensed to the operator and thus needs to be managed by the operator, e.g., to avoid interference. Another example is that the operator may desire to only grant specific users access to the D2D communication, e.g., emergency workers, subscribers to a D2D service, etc.

It would be advantageous to provide more control over the D2D communication between mobile devices which are connectable to a mobile network.

To better address this concern, a first aspect of the invention provides a method for establishing a D2D communication session between mobile devices which are mutually connectable via a D2D communication channel and individually connectable to a mobile network, comprising:
   preloading an initiation key on each of the mobile devices, the initiation key being associated with a validity period; and
   on each of the mobile devices:
   verifying a validity of the initiation key based on a current time;
   if the initiation key is deemed valid, generating a session key using the initiation key by using the initiation key in performing a key agreement procedure between the mobile devices over the D2D communication channel, the key agreement procedure resulting in the session key if the initiation key used by each of the mobile devices matches; and
   establishing the D2D communication session over the D2D communication channel based on the session key.

A further aspect of the invention provides control software comprising instructions for, upon execution of the control software on a mobile device, causing the mobile device to establish the D2D communication session according to the method set forth.

A further aspect of the invention provides a mobile device for establishing a D2D communication session with a further mobile device, the mobile device and the further mobile device being mutually connectable via a D2D communication channel and individually connectable to a mobile network, the mobile device comprising:
   a storage area for storing an initiation key which is provided during a preloading procedure, the initiation key being associated with a validity period; and
   a computing subsystem for:
   verifying a validity of the initiation key based on a current time;

if the initiation key is deemed valid, generating a session key using the initiation key by using the initiation key in performing a key agreement procedure with the further mobile device over the D2D communication channel, the key agreement procedure resulting in the session key if the initiation key used by the mobile device and the further mobile device matches; and a mobile subsystem for establishing the D2D communication session over the D2D communication channel based on the session key.

A further aspect of the invention provides a mobile network arranged for preloading an initiation key on the mobile device set forth when the mobile device is connected to the mobile network, the initiation key being associated with a validity period.

The aforementioned measures establish, or provide the means to establish a D2D communication session between mobile devices which are mutually connectable via a D2D communication channel and individually connectable to a mobile network. Here, the term communication channel refers to a conduit for an information exchange between the mobile devices, and the term communication session refers to the information interchange, with the information interchange typically having a defined start and end.

The mobile devices are connectable to the mobile network in that, when the mobile devices are connected to the mobile network, mobile communication between the mobile devices can take place via the mobile network, e.g., via the base stations and the core nodes of the mobile network. The mobile devices are also arranged for establishing a D2D communication channel between the mobile devices so as to enable direct communication. The D2D communication may be established between two mobile devices. However, the D2D communication may equally involve a plurality of more than two mobile devices.

The D2D communication session is established, i.e., set up, in the following manner. First, an initiation key is preloaded on each of the mobile devices. Here, the term preloading refers to a loading of the initiation key on a mobile device before establishing the D2D communication session. For example, the initiation key may be loaded on the mobile device already before a request is received to establish the D2D communication session. The initiation key is used on each of the mobile devices in establishing the D2D communication session. Hence, when a request for establishing the D2D communication session is received, e.g., from the user or another mobile device, it is not necessary anymore to obtain the initiation key in order to establish the D2D communication session, i.e., it is already available on the mobile device.

The initiation key is used in establishing the D2D communication session in the following ways. The initiation key is associated with a validity period. The validity period is available to the mobile device, e.g., by being provided next to the initiation key, being derivable from the initiation key, etc. The validity period indicates a period in time in which the initiation key is deemed to be valid for use in establishing the D2D communication session. On each of the mobile devices which are to take part in the D2D communication session, a validity of the initiation key is verified based on the current time. This may be in response to a request to establish the D2D communication session. The current time is thus used to determine whether the initiation key is considered to be valid or not. If the initiation key is considered to be valid, e.g., due to the current time being in the validity period, the initiation key is used in performing a key agreement procedure between the mobile devices.

Here, the term key agreement procedure refers to a procedure which is performed between the mobile devices which results in a session key being agreed on, with the mobile devices each being able to influence the outcome of the procedure, i.e., the session key. The key agreement procedure is performed via the D2D communication channel, e.g., by exchanging messages between the mobile devices, with the messages together constituting the key agreement procedure. The messages may be exchanged as part of an initial D2D communication session having been established over the D2D communication channel.

The key agreement procedure provides the session key based on whether the initiation key, as used by each respective mobile device in the key agreement procedure, matches. As such, a valid session key is obtained provided that each respective mobile device uses a same initiation key in the key agreement procedure. The session key constitutes a key used for cryptographically protecting messages in a communication session, such as confidentiality protection using encryption or integrity protection using message authentication codes. The D2D communication session is established using the session key. Thus, a D2D communication session is obtained in which messages, such as those of a voice or video transmission between the mobile devices, are cryptographically protected using the session key. The session key is used for a particular D2D communication session. Hence, in order to establish a new D2D communication session at a later moment in time, typically a new session key needs to be obtained or generated.

The above measures have the effect that a D2D communication session is established based on an initiation key. Here, the initiation key essentially functions as an authorization token in that a mobile device needs the initiation key to establish the D2D communication session. By providing an initiation key which is associated with a validity period and verifying the validity of the initiation key on the mobile device based on a current time, a time-based control mechanism is provided in that the initiation key is deemed valid only in a predetermined period and deemed invalid outside of said period.

The above measures offer control to the operator over the D2D communication in the following ways. By requiring a valid initiation key to establish the D2D communication session, the operator obtains control in that he can chose to whom the initiation key is provided, according to which conditions, etc. Moreover, by means of the validity period, the operator obtains time-based control, e.g., so as to prevent the re-use of old initiation keys. By using the initiation key in a key agreement procedure which is based on a match of the initiation keys used by the mobile devices, the operator obtains control in that not just any initiation key can be used in establishing the D2D communication session; rather, a success of the key agreement procedure depends on whether the initiation key, as used by each of the mobile devices in establishing the D2D communication session, matches.

Advantageously, by preloading the initiation key, the D2D communication session can be established under the operator's control even when one or more of the mobile devices are currently outside the operator's direct control, e.g., by being outside a range of the mobile network. Advantageously, the mobile devices can autonomously establish the D2D communication session, i.e., without a need for contacting $3^{rd}$ parties.

Optionally, the preloading the initiation key comprises providing the initiation key to each of the mobile devices via the mobile network when each respective mobile device is connected to the mobile network. Preloading the initiation key via the mobile network is convenient as mobile devices are frequently connected to the mobile network and thus no additional means is needed for preloading the initiation key. Advantageously, the mobile network provides a secure channel for preloading the initiation key. Advantageously, the initiation key can be automatically preloaded, i.e., without requiring user actions.

Optionally, the preloading the initiation key comprises storing the initiation key in a secure storage area of each respective mobile device. The initiation key is thus stored such that it cannot be easily read by, e.g., the user or an application running on the mobile device. Advantageously, a tampering with the initiation key is made more difficult.

Optionally, the secure storage area is provided by a trusted computing subsystem of each respective mobile device. Here, the mobile device comprises, either as an integral part or as a removable part, a trusted computing subsystem. Such a trusted computing subsystem may be used for performing computing steps on the mobile device which require a certain level of security, such as authenticating the mobile device on the mobile network. An example of a removable trusted computing subsystem is a so-termed Universal Integrated Circuit Card (UICC) which may, in turn, comprise a Universal Subscriber Identity Module (USIM) application for use in authenticating the mobile device on the mobile network. The secure storage area provided by such a trusted computing subsystem, e.g., the memory of the UICC, is well suited for securely storing the initiation key on the mobile device.

Optionally, at least one of the group of: verifying the validity of the initiation key, and using the initiation key in performing the key agreement procedure, is performed by the trusted computing subsystem. Hence, the use of the initiation key outside of the secure storage area provided by the trusted computing subsystem is reduced or avoided. Advantageously, a tampering with the initiation key is made more difficult.

Optionally, the method further comprises:
  preloading a set of initiation keys on each of the mobile devices, the set of initiation keys key being associated with a respective set of validity periods; and
  performing a key synchronization procedure between the mobile devices over the D2D communication channel for selecting a matching one of the set of initiation keys on each of the mobile devices as the initiation key.

As such, each of the mobile devices is provided with multiple different initiation keys. To enable a same initiation key being used by each of the mobile devices in establishing the D2D communication session, a key synchronization procedure is performed in which it is identified which initiation key is available to all or most of the mobile devices, with said initiation key being selected for use in establishing the D2D communication session. Advantageously, a suitable initiation key can be conveniently established. Advantageously, the key synchronization procedure provides feedback if a mobile device does not have a suitable initiation key before performing the key agreement procedure.

Optionally, the method further comprises:
  preloading a set of key identifiers on each of the mobile devices, each of the set of key identifiers identifying a respective one of the set of initiation keys; and
  performing the key synchronization procedure based on an exchange of one or more of the set of key identifiers between the mobile devices.

By performing the key synchronization procedure based on an exchange of one or more of the set of key identifiers, it is not needed to involve the initiation keys themselves in the key synchronization procedure, e.g., by exchanging the initiation keys over the D2D communication channel. Advantageously, a tampering with the initiation keys is made more difficult since only the key identifiers are exchanged. Nevertheless, a tampering of the key identifiers, e.g., so as to feign a matching of initiation keys, will still fail as the key agreement procedure only provides the session key if the actual initiation keys match.

Optionally, the method further comprises disabling or removing the initiation key from the set of initiation keys after use in establishing the D2D communication session. Thus, an initiation key can only be used once in establishing a D2D communication session. For establishing a new D2D communication session, a new initiation key is needed. Advantageously, the operator obtains control over a number of times that a D2D communication session can be established, e.g., for limiting said number of times.

Optionally, the set of validity periods is constituted at least in part by different but overlapping validity periods. The different but overlapping validity periods together constitute a larger period in time. Since the validity periods overlap, there are no gaps in the larger period in time. The different but overlapping validity periods are associated with initiation keys. As a result, at any point in time in the larger period, an initiation key is available that can be validly used in establishing the D2D communication session.

Optionally, the initiation key is associated with a virtual network identity, and the verifying the validity of the initiation key further comprises determining a match of the virtual network identity on each of the mobile devices via the D2D communication channel. Thus, the D2D communication session can only be established between mobile devices that have a same virtual network identity. Advantageously, the operator can set up a virtual network of mobile devices between which D2D communication is possible, while preventing D2D communication with mobile devices outside of said virtual network or between mobile devices belonging to different virtual networks.

Optionally, the initiation key is associated with a usage count for limiting a number of uses of the initiation key, and the verifying the validity of the initiation key is further based on the usage count. Advantageously, the operator obtains control over a number of times that a D2D communication session can be established. Advantageously, said control can be provided with one initiation key, e.g., a master key, which can be used for establishing multiple D2D communication sessions. Thus, it is not needed to provide a set of initiation keys which each can only be used once for establishing a D2D communication session.

Optionally, the method further comprises adjusting the usage count after use of the initiation key in establishing the D2D communication session. Hence, a use of the initiation key in establishing a D2D communication session is reflected in the usage count.

Optionally, the method further comprises requesting a further initiation key via the mobile network if i) no initiation key is deemed valid, or ii) the key agreement procedure fails in providing the session key.

Optionally, the key agreement procedure comprises:
  a three-pass authentication procedure; or
  a use of the initiation key to encrypt a message exchange between the mobile devices for obtaining a shared secret, and a Diffie-Hellman key exchange procedure which is initiated based on the shared secret.

Modifications and variations of the control software, the mobile device and the mobile network, which correspond to the described modifications and variations of the method, can be carried out by a person skilled in the art based on the present description.

The invention is defined in the independent claims. Advantageous yet optional embodiments are defined in the dependent claims.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
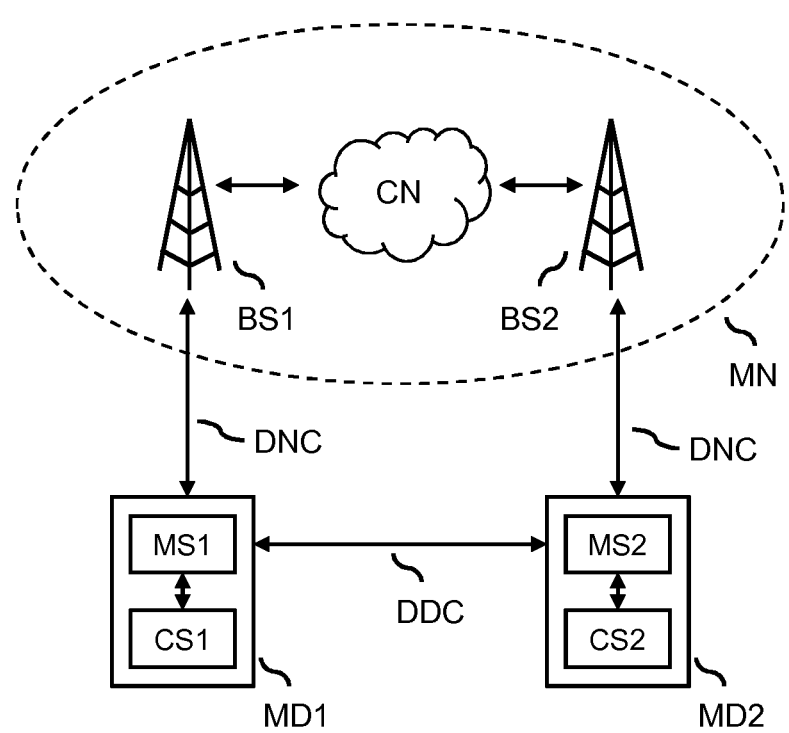
FIG. 1 shows mobile devices which are mutually connectable via a D2D communication channel and individually connectable to a mobile network.

FIG. 1 shows a first mobile device MD1 and a second mobile device MD2, henceforth also jointly referred to as mobile devices MD. The mobile devices MD are individually connectable to a mobile network MN. This is illustrated in FIG. 1 by a communication channel existing between each mobile device MD and the mobile network MN, i.e., a device-to-network communication channel DNC. The mobile network MN is shown to comprise base-stations BS1, BS2. In this particular example, each of the mobile devices MD is connected to a different one of the base-station BS1, BS2. The base-stations BS1, BS2 are mutually connected via core nodes CN of the mobile network. As such, when the mobile devices MD are connected to the mobile network MN, communication between the mobile devices MD can take place via the mobile network MN in that an information interchange can be performed via a first one of the base-stations BS1, the core nodes CN, and a second one of the base-stations BS2 of the mobile network MN, or vice versa.

The mobile devices MD are also mutually connectable via a D2D communication channel DDC. The D2D communication channel DDC may have been established or setup using a mobile subsystem MS1, MS2 of each respective mobile device MD1, MD2. The present invention involves establishing a D2D communication session between the mobile devices MD over the D2D communication channel DDC.

Figure 2:
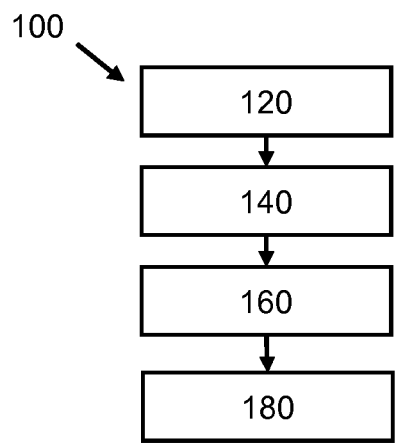
FIG. 2 shows a method for establishing a D2D communication session between the mobile devices.

The D2D communication session may be established in accordance with the method 100 as shown in FIG. 2. The method 100 comprises firstly preloading 120 an initiation key on each of the mobile devices MD. The preloading 120 may be performed using the mobile network MN. For that purpose, the mobile network MN may be arranged for, when one of the mobile devices MD is connected to the mobile network MN, providing the initiation key to said mobile device MD via the device-to-network communication channel DNC. However, the preloading 120 may also involve another communication channel, and in particular a secure communication channel. For example, the initiation key may be preloaded using Near Field Communication (NFC), e.g., at a physical point of sale, or using Wi-Fi, e.g., via a Wireless Local Area Network (WLAN).

Although not shown in FIG. 1, each mobile device MD may comprise a storage area for storing the initiation key on the respective mobile device MD. Consequently, the step of preloading 120 the initiation key on each of the mobile devices MD may comprise storing the initiation key in the storage area of the respective mobile device MD.

The initiation key is associated with a validity period. The method 100 further comprises, on each of the mobile devices MD, verifying 140 a validity of the initiation key based on a current time. For that purpose, each mobile device MD1, MD2 comprises a computing subsystem CS1, CS2 which is arranged for performing said step and which may have knowledge of the current time or be arranged for obtaining the current time. It is noted that the validity period may be expressed in any suitable time-based quantity, e.g., a day, an hour of a day, a minute of an hour, etc. Consequently, the term current time may refer to, e.g., a current day and/or a current time of the day. Hence, verifying the validity of the initiation key may comprise determining whether the current day falls within the validity period, and if so, whether the current day is either a first day or a last day of the validity period, and if so, whether the current time of the day falls within the validity period.

The method 100 further comprises, on each of the mobile devices MD, if the initiation key is deemed valid, generating 160 a session key using the initiation key by using the initiation key in performing a key agreement procedure between the mobile devices MD over the D2D communication channel DDC. The computing subsystem CS1, CS2 of each mobile device MD is arranged for performing said step, while involving the mobile subsystem MS1, MS2 to carry out an actual message exchange over the D2D communication channel DDC.

The key agreement procedure is arranged for resulting in the session key if the initiation key used by each of the mobile devices MD matches. Having obtained the session key, the method 100 comprises, on each of the mobile devices MD, establishing 180 the D2D communication session over the D2D communication channel DDC based on the session key. The mobile subsystem MS1, MS2 of each mobile device MD is arranged for performing said step using the session key obtained from the computing subsystem CS1, CS2.

Although not shown in FIG. 2, control software may be provided comprising instructions for, upon execution of the control software on a mobile device, causing the mobile device to establish the D2D communication session according to the method 100 as shown in FIG. 2, i.e., by verifying 140 a validity of the initiation key based on a current time, generating 160 a session key using the initiation key, and establishing 180 the D2D communication session over the D2D communication channel based on the session key.

Figure 3:
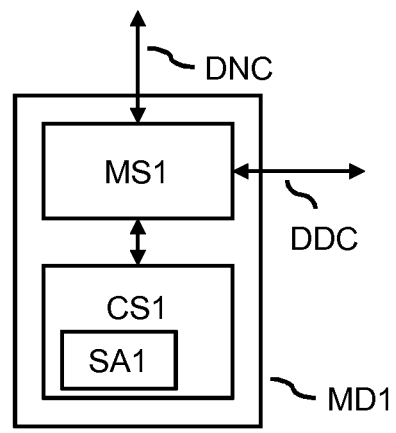
FIG. 3 shows a mobile device comprising a mobile subsystem and a computing subsystem, the computing subsystem comprising a storage area.

FIG. 3 shows the first mobile device MD1 in more detail, with the first mobile device MD1 here being exemplary of each of the mobile devices MD. The first mobile device MD1 comprises a mobile subsystem MS1 and a computing subsystem CS1 as introduced earlier in reference to FIGS. 1 and 2. Here, the term mobile subsystem refers to a subsystem of the mobile device that performs and/or enables the main functionality of the mobile device, including establishing a communication channel, exchanging messages over the established communication channel, performing various computing functions, etc. An example of a mobile subsystem is a mobile System on a Chip (SoC) comprising an application processor, a display processor, one or more modems, an integrated LTE radio. Another example is said mobile SoC and an external LTE radio which is connected to the mobile SoC.

FIG. 3 shows the first mobile device MD1 comprising a storage area SA1 for storing the initiation key as provided during the preloading procedure. The storage area SA1 may be a secure storage area. In the example of FIG. 3, the storage area SA1 is provided by the computing subsystem CS1. The computing subsystem CS1 may be a trusted computing subsystem, thereby automatically providing a secure storage area. Such a trusted computing subsystem CS1 may be constituted by a UICC which comprises a USIM application. The USIM application may be arranged for establish the D2D communication session according to the method 100 as shown in FIG. 2. The interface to and from the UICC may be protected by means of secure channel protocol, e.g., according to the ETSI TS 102 484 technical specification, so as to make eavesdropping and tampering more difficult.

In the following, two detailed embodiment of the present invention are presented which each comprise various advantageous yet optional measures. It will be appreciated that those measures may also be combined and/or individually applied to the general concept of the present invention, unless prevented by technical incompatibilities.

The first detailed embodiment comprises preloading a set of initiation keys on each of the mobile devices MD, the set of initiation keys key being associated with a respective set of validity periods. For that purpose, the mobile network MN may send one or more messages to the computing subsystem CS1, CS2 of each mobile device MD1, MD2 via each respective mobile subsystem MS1, MS2. The one or more messages may comprise the set of initiation keys and the set of validity periods. In addition, the one or more messages may comprise a current network time and/or a set of limitations. In addition to the set of initiation keys and the set of validity periods, the one or messages may comprise a set of key identifiers, each of the set of key identifiers identifying a respective one of the set of initiation keys. In addition to the set of initiation keys and the set of validity periods, the one or more messages may comprise a set of virtual network identities, each of the set of virtual network identities being associated with a respective one of the set of initiation keys.

The following table shows an example of the information which may be preloaded on a mobile device:

| Virtual Network Id | Key Id | Initiation key | Valid from (hh:mm dd:mm:yyyy) | Valid Through (hh:mm dd:mm:yyyy) |
|---|---|---|---|---|
| Corporation X | 102 | Secret123 | 11:00 01/01/2012 | 13:00 02/01/2012 |
| Corporation X | 103 | Geheim123 | 11:00 01/01/2012 | 13:00 02/01/2012 |
| Corporation X | 104 | gEHEIM321 | 11:00 01/01/2012 | 13:00 02/01/2012 |
| Corporation X | 105 | SeCRet123 | 11:00 02/01/2012 | 13:00 03/01/2012 |
| Corporation X | 106 | GeHEim123 | 11:00 02/01/2012 | 13:00 03/01/2012 |
| Corporation X | 107 | sEcrET321 | 11:00 02/01/2012 | 13:00 03/01/2012 |
| Operator Y | 53 | sECRET321 | 00:00 01/12/2011 | 03:00 01/01/2012 |
| Operator Y | 54 | 123secret | 00:00 01/12/2011 | 03:00 01/01/2012 |
| Operator Y | 55 | sECRet321 | 00:00 01/01/2012 | 03:00 01/02/2012 |
| Operator Y | 56 | 123seCRet | 00:00 01/01/2012 | 03:00 01/02/2012 |

In general, as is the case in the above example, the set of validity periods may be constituted at least in part by different but overlapping validity periods.

Each computing subsystem CS1, CS2 may store the set of initiation keys, the set of key identifiers and the current network time in a secure storage area SA1 of the computing subsystem. Each computing subsystem CS1, CS2 may also dispose of any initiation keys already stored which have expired according to the current network time. The set of virtual network identities may be stored elsewhere in each of the mobile devices MD1, MD2, i.e., may not need to be stored in the computing subsystem CS1, CS2.

As part of establishing the D2D communication session over the D2D communication channel DDC, it may be determined whether a virtual network identity on each of the mobile devices MD matches. This allows enabling D2D communication sessions to be established between mobile devices MD which share a virtual network identity, whilst preventing D2D communication sessions from being established between mobile devices MD which do not share a virtual network identity. For example, a corporate mobile device may comprise a virtual network identity of the corporation as well as a virtual network identity of the operator's own virtual network. The latter may allow users to establish a D2D communication session with other users of the operator's mobile network. In general, virtual network identities may be provided for, e.g., a certain locality, certain group of users, companies, families, etc. A virtual network identity may also be provided that allows cross-operator D2D communication sessions to be established, i.e., between mobile devices which normally belong to mobile networks that are operated by different operators.

Figure 4:
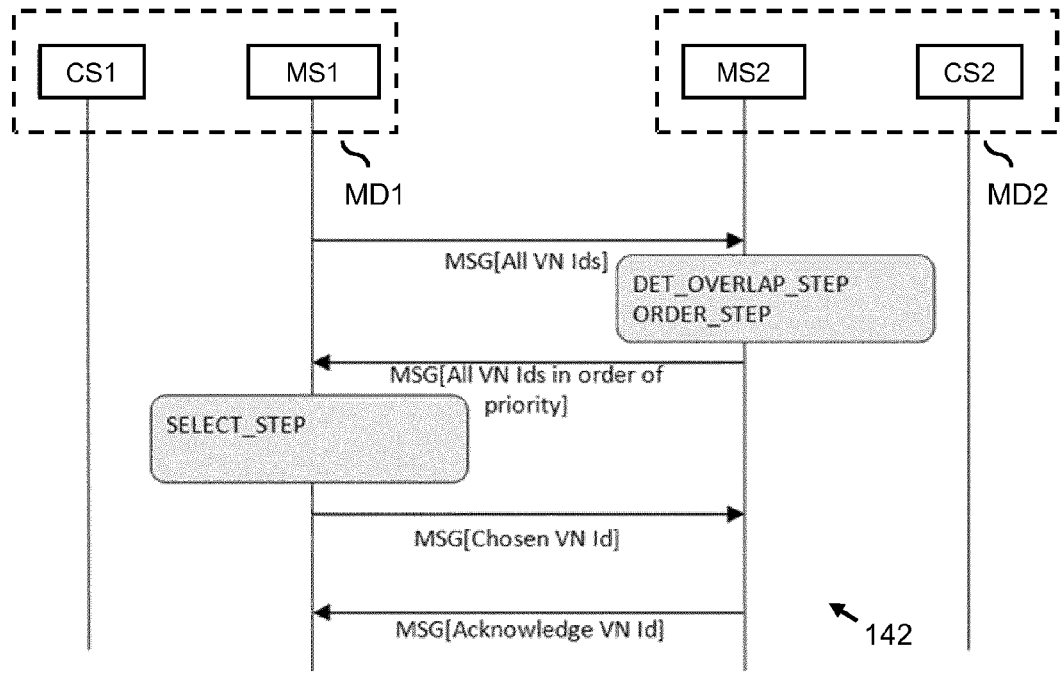
FIG. 4 shows a determining a match of a virtual network identity on each of the mobile devices via the D2D communication channel.

FIG. 4 shows an example 142 of how a match of a virtual network identity on each of the mobile devices MD may be determined via the D2D communication channel DDC. Here, the computing subsystem CS1 and mobile subsystem MS1 of the first mobile device MD1 are schematically shown on a left-hand side, and the computing subsystem CS2 and mobile subsystem MS2 of the second mobile device MD2 are shown on a right hand side. Furthermore, a message exchange between the mobile devices MD1, MD2 via the D2D communication channel DDC is show schematically over time by means of arrows which indicate a source and destination of the message. Moreover, rounded rectangles are used to indicate steps being performed by either of the mobile devices MD1, MD2, with a horizontal position of a rectangle indicating on which subsystem the step is performed.

A match of the virtual network identity may be determined as follows. Firstly, the first mobile device MD1 sends a message to the second mobile device MD2 over the D2D communication channel, the message comprising many or all of the virtual network identities which are stored on the first mobile device MD1. In response, in a step titled DET_OVERLAP_STEP, the second mobile device MD2 determines which of the virtual network identities of the first mobile device MD1 overlap with those stored locally, i.e., on the second mobile device MD2. Moreover, in a step titled ORDER STEP, the overlapping virtual network identities are ordered according to a priority list of the second mobile device MD2, and a result thereof is sent by message to the first mobile device MD1. Upon receipt, in a step titled SELECT STEP, the overlapping virtual network identities are also ordered according to a priority list of the first mobile device MD1, and one of the overlapping virtual network identities is selected which ranks highest when combining both priority lists. Finally, the selected virtual network identity is sent by message to the second mobile device MD2, which in turn acknowledges the selected virtual network identity by return message.

The verifying the validity of the initiation key may comprise the aforementioned determining of the match of the virtual network identity on each of the mobile devices via the D2D communication channel. Consequently, if no matching virtual network identity can be found, the initiation keys on both mobile devices may be considered invalid for the purpose of establishing a D2D communication session between the mobile devices MD since said keys are associated with non-matching virtual network identities.

Figure 5:
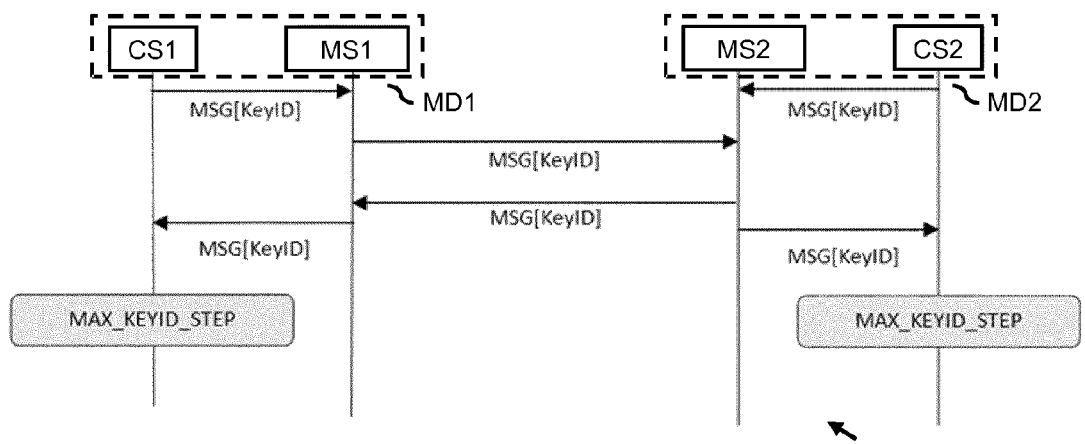
FIG. 5 shows a performing a key synchronization procedure between the mobile devices over the D2D communication channel.

Having verified the match of the virtual network identity, the establishing of the D2D communication session may continue as follows. Each of the mobile devices MD1, MD2 may be arranged for performing a key synchronization procedure between the mobile devices over the D2D communication channel for selecting a matching one of the set of initiation keys on each of the mobile devices as the initiation key. FIG. 5 shows an example 162 of such a key synchronization procedure. This particular example is based on an exchange of one or more of the set of key identifiers between the mobile devices MD1, MD2. Here, upon request from the mobile subsystem MS I, the computing subsystem CS1 searches for a key identifier which is associated with a valid initiation key, meaning that said initiation key is valid at the current time and has not been used before in establishing a D2D communication session. The computing subsystem CS1 may search for the key identifier based on various criteria, such as, e.g., whether a key identifier is valid at the current time and a reasonable period in the future, e.g., the next 15 minutes. The search may also be based on a key sequence number associated with each of the key identifiers, with the computing subsystem CS1 selecting one of the key identifiers that is associated with a lowest key sequence number. In case the key identifiers are numerical, the computing subsystem CS1 may also select a lowest one of the key identifiers. In case the key identifiers are sequentially ordered, the computing subsystem CS1 may also select a first or last one of the key identifiers. It will be appreciated that various criteria such as the above may be combined.

The computing subsystem CS1 sends the key identifier KeyID which was found to the mobile subsystem MS 1, which in turn sends it to the second mobile device MD2. On the second mobile device MD2, the mobile subsystem MS2 forwards the key identifier KeyID to the computing subsystem CS2. Moreover, the second mobile device MD2 also performs a same process, either in parallel or after receiving the key identifier KeyID from the first mobile device MD1. As a result, the computing subsystems CS1, CS2 on each mobile device MD1, MD2 comprise both key identifiers. Each computing subsystem CS1, CS2 then selects, in a step titled MAX_KEYID_STEP, the key identifier which is highest, thereby also selecting the initiation key which is identified by said key identifier.

It is noted that, in general, initiation keys may be disabled or removed after use in establishing a D2D communication session. In this case, however, certain types of key synchronization procedures, such as the example shown in FIG. 5, may lead to a rapid consumption of initiation keys. Alternatively, the first mobile device MD1 may send the key identifier to the second mobile device MD2. The second mobile device MD2 may request its computing subsystem CS2 to determine if it comprises a valid initiation key associated with this key identifier. If so, the initiation key may be directly selected. If not, the computing subsystem CS2 may search for a lowest key identifier which is associated with a valid initiation key, and return the found key identifier to the mobile subsystem MS2 for sending to the first mobile device MD1. Upon receipt, the first mobile device MD1 may request its computing subsystem CS1 to determine if it comprises a valid initiation key associated with this key identifier. If so, the initiation key may be directly selected. If not, the computing subsystem CS1 may search for a lowest key identifier and again repeat the above process.

It is noted that the above alternative key synchronization procedure may be repeated several times. Alternatively, the key synchronization procedure may be based on an exchange of many or all key identifiers available to each respective mobile device so as to more rapidly determine a key identifier that identifies a matching and valid initiation key.

Figure 7:
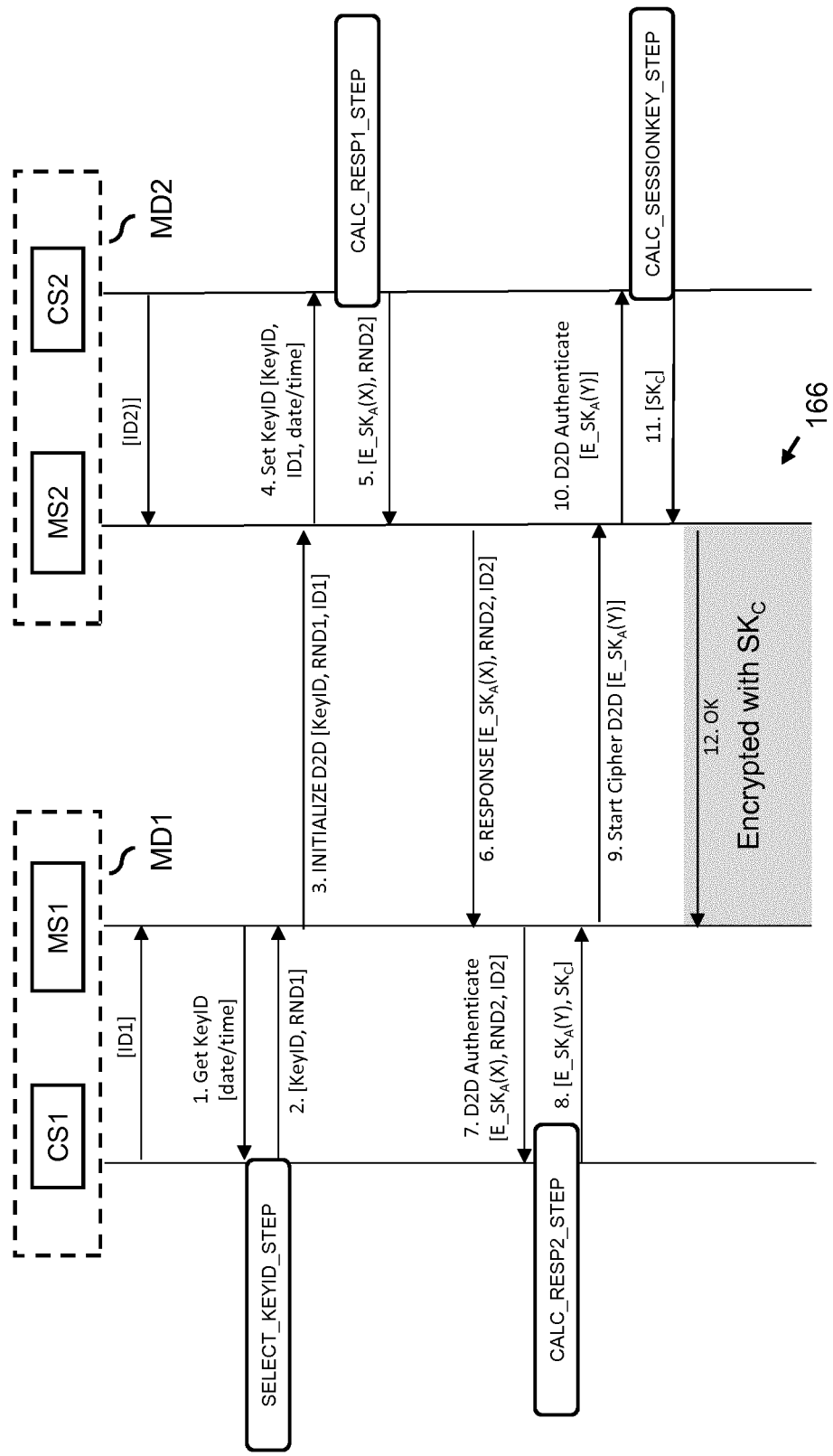
FIG. 7 shows a key agreement procedure being performed over the D2D communication channel, being based on a three-pass authentication procedure.
Figure 8:
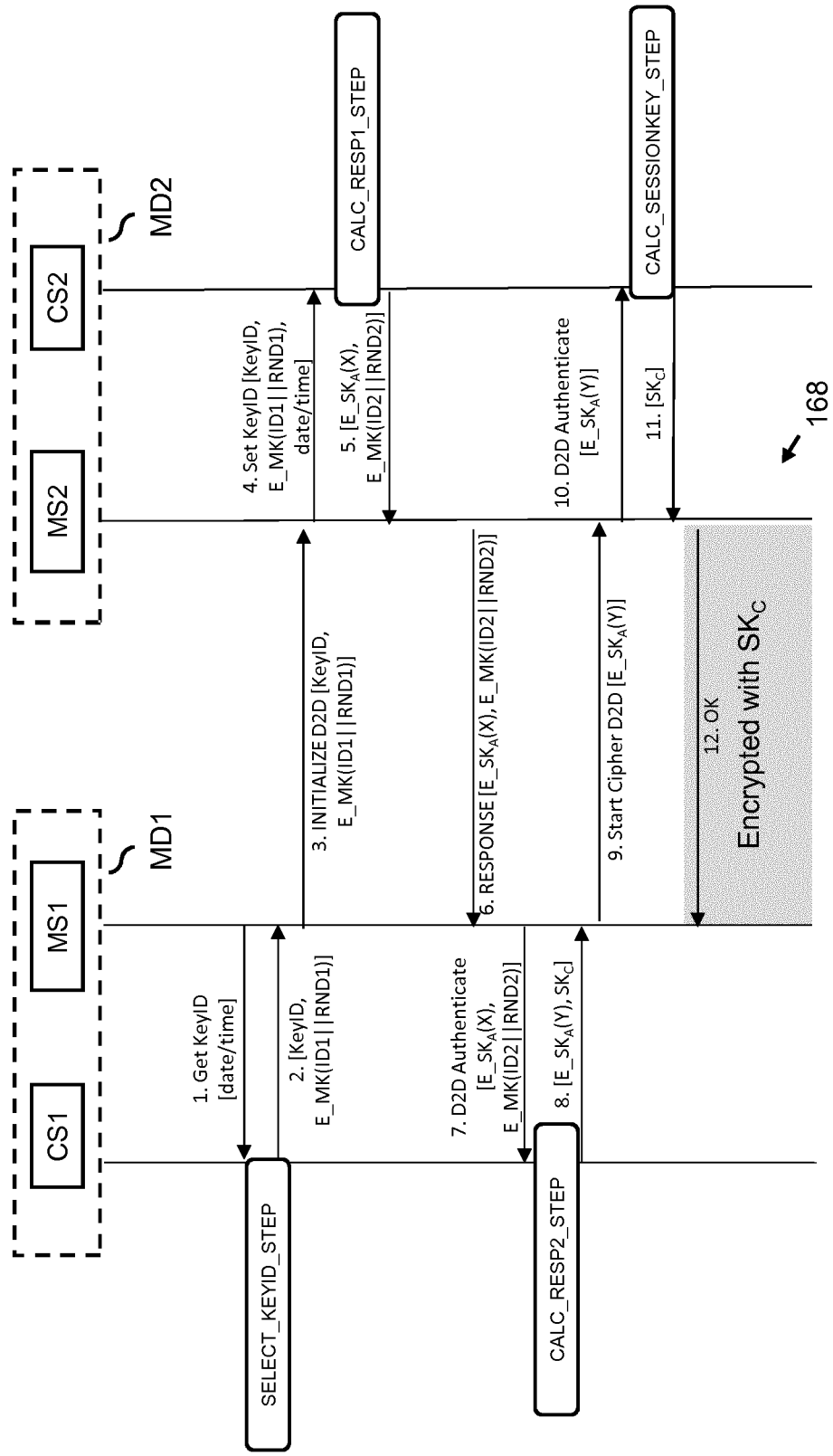
FIG. 8 shows another key agreement procedure being performed over the D2D communication channel in which identifiers identifying the mobile devices are encrypted.

It is further noted that the key exchange procedure may be combined with an authentication procedure. The authentication procedure may be a prerequisite part of the setup of the D2D communication session. As a result, messages which are exchanged between the mobile devices may serve both for the purpose of authentication as well as for key exchange. FIGS. 7 and 8 show an example of this. For example, a message may constitute a challenge response from one mobile device while at the same time being part of the key exchange procedure between the mobile devices.

Figure 6:
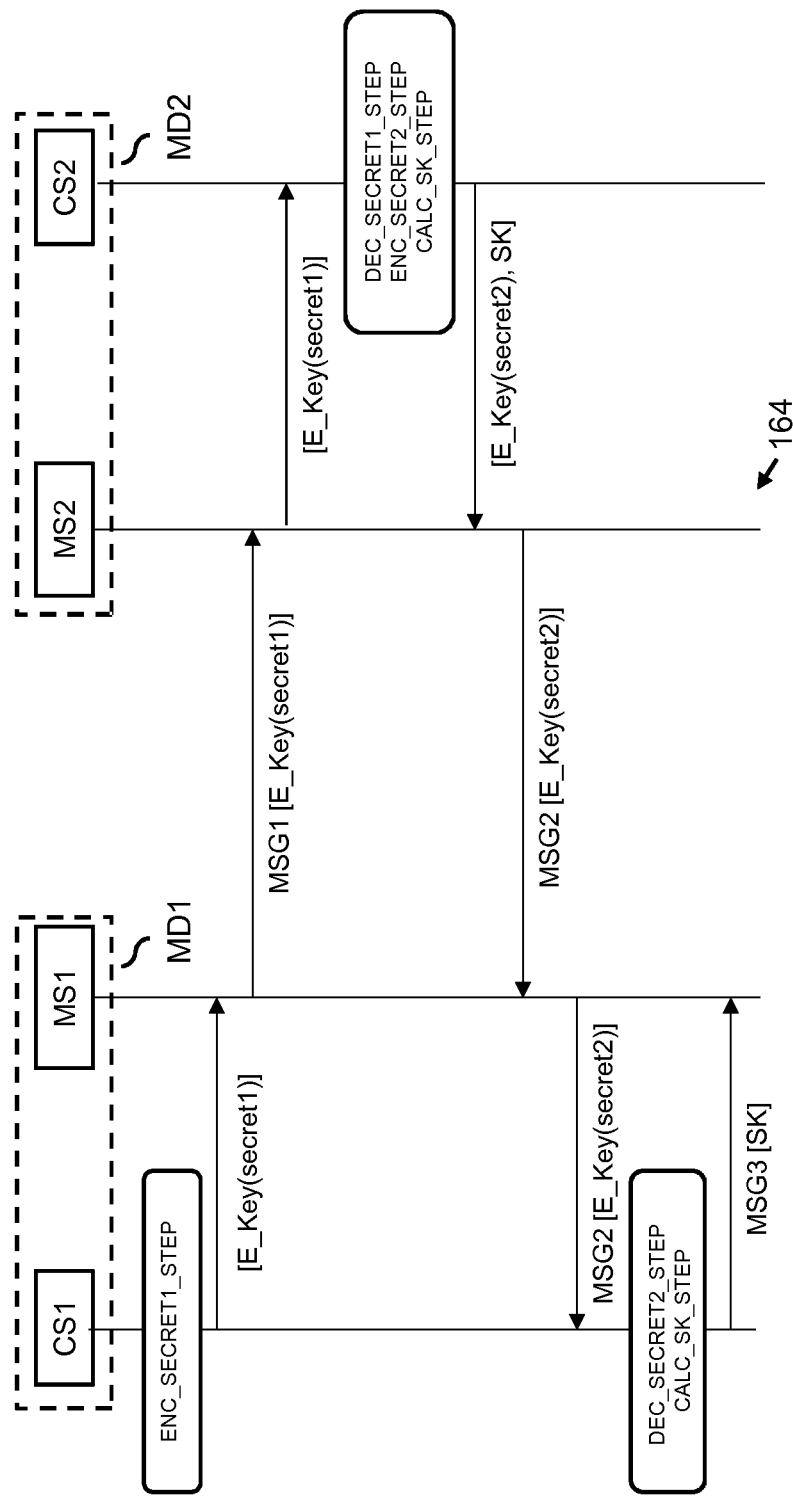
FIG. 6 shows a key agreement procedure being initialized over the D2D communication channel by using an initiation key to encrypt a message exchange between the mobile devices for obtaining a shared secret.

Having selected a matching one of the set of initiation keys on each of the mobile devices as the initiation key, the establishing of the D2D communication session may continue by using the initiation key in performing a key agreement procedure between the mobile devices over the D2D communication channel. FIG. 6 shows an example 164 of a first part of such a key agreement procedure, which comprises using the initiation key to encrypt a message exchange between the mobile devices for obtaining a shared secret. This first part of the key agreement procedure may be used to initialize a key exchange procedure based on the shared secret. Essentially, the first part of the key agreement procedure may be considered as a bootstrapping of the subsequent key exchange. An example of such a key exchange procedure is the Diffie-Hellman key exchange as known from the field of cryptography.

In the example of FIG. 6, each of the computing subsystems CS1, CS2 retrieves the initiation key from the storage area. In a step titled ENC_SECRET1_STEP, the computing subsystem CS1 of the first mobile device MD1 creates a message which comprises a secret, i.e., secret1, encrypted with the initiation key. The message is forwarded to the mobile subsystem MS1 which in turn sends the message to the second mobile device MD2. Here, the mobile subsystem MS2 forwards the message to the computing subsystem CS2. In a step titled DEC_SECRET1_STEP, the computing subsystem CS2 decrypts the message with the initiation key. In a step titled ENC_SECRET2_STEP, the computing subsystem CS2 creates a message with another secret, i.e., secret 2, encrypted with the initiation key. Moreover, in a step titled CALC_SK_STEP, a session key SK is calculated based on the combination of both secrets, i.e., secret1 and secret2, and included in the message. The message is sent back by the second mobile device MD2 to the first mobile device MD1. Here, the mobile subsystem MS1 forwards the message to the computing subsystem CS1. In a step titled DEC_SECRET2_STEP, the computing subsystem CS1 decrypts the message with the initiation key. In a step titled CALC_SK_STEP, the session key SK is calculated based on the combination of both secrets. As a result, on each of the computing subsystems CS1, CS2, both secrets are available, i.e., secret1 and secret2, thus allowing the respective computing subsystems to calculate a same session key SK.

It is noted that instead of the example of FIG. 6, various alternative mechanisms may be used as well for obtaining the shared secret. For example, one of the point-to-point key establishment mechanisms as described in the ISO/IEC 11770-2 standard may be used. For example, the key establishment mechanism 5 as described in section 6.5 of said document may be used.

As a result of the subsequent key exchange procedure, a session key is obtained on each of the mobile devices MD1, MD2. This allows the D2D communication session to be established over the D2D communication channel based on the session key.

A second detailed embodiment comprises preloading a so-termed master key on each of the mobile devices MD1, MD2. Here, the term master key refers to an initiation key which is combined with a usage count so as to allow multiple D2D communication sessions to be established using one initiation key. The initiation key and the usage count constitute an alternative to the preloading of a plurality of initiation keys which may each be used only once in establishing a D2D communication session. It is noted that the initiation key may constitute a master key in that, each time an initiation key is needed for establishing a particular D2D communication session, a temporary initiation key is derived from the master key for that purpose. Hence, the initiation key may be used multiple times to establish a temporary initiation key for use in a particular D2D communication session. The mobile network MN may provide the computing subsystem CS1, CS2 of each mobile device MD1, MD2 with such an initiation key, the initiation key being valid for a particular validity period. Moreover, the mobile network MN may provide or set the usage count. The usage count may represent, e.g., a number of time the computing subsystem is allowed to generate a session key using the initiation key. The mobile network MN may also periodically provide the current network time so as to enable each computing subsystem CS1, CS2 to dispose of any initiation keys stored in the computing subsystem which have already expired according to the current network time. Additionally or alternatively, the mobile network MN may provide the current network time when preloading an initiation key on a mobile device MD1, MD2.

After having possibly verified a match of a virtual network identity, the validity of the initiation key is verified based on a current time and the usage count, and if the initiation key is deemed valid, the initiation key is used in performing a key agreement procedure between the mobile devices over the D2D communication channel. An example 166 of this is shown in FIG. 7, where the key agreement procedure is shown which is based on a three-pass authentication procedure, as specified by, e.g., the ISO/IEC 9798-4 standard.

Initially, each computing subsystems CS1, CS2 provides an identifier, i.e., ID1 and ID2, respectively, to each respective mobile subsystem MS1, MS2. Each identifier ID1, ID2, identifies the respective mobile device MD1, MD2. The identification may be indirect in that each identifier ID1, ID2 may identify the respective computing subsystem CS1, CS2, which in turn allows the mobile device MD1, MD2 to be identified since the computing subsystem CS1, CS2 is an integral or removable part of the mobile device.

The further steps shown in FIG. 7 may be explained as follows. Here, the numerals correspond to those shown in FIG. 7.

1. The first mobile device MD1, being in this example the mobile device initiating the key agreement procedure, requests the computing subsystem CS1 to provide an key identifier KeyID which identifies an initiation key that is valid at the current time. The computing subsystem CS1 determines, in a step titled SELECT_KEYID_STEP, whether it comprises such an initiation key and if so, whether usage of the initiation key is still allowed, e.g., by checking whether the usage count is still below a given threshold in case the usage count corresponds to a number of uses, or whether the usage count is still above zero in case the usage count corresponds to a number of remaining uses. If this is the case, the initiation key is considered to be valid, and the computing subsystem CS1 establishes a key identifier KeyID identifying the initiation key. Moreover, the computing subsystem CS1 generates a random RND1, the random RND1 constituting a challenge in the authentication of the computing subsystem CS2 of the second mobile device MD2.

2. The computing subsystem CS1 provides the key identifier KeyID and the random RND1 to the mobile subsystem MS1 of the first mobile device MD1.

3. The first mobile device MD1 sends the key identifier KeyID, the random RND1 and the identifier ID1 to the second mobile device MD2 over the D2D communication channel DDC so as to initialize the key agreement procedure.

4. In response, the second mobile device MD2 requests its computing subsystem CS2 to initiate the key agreement procedure. For that purpose, it provides the key identifier KeyID, the random RND1 and the identifier ID1 to the computing subsystem CS2. In addition, the computing subsystem CS2 may request the second mobile device MD2 to provide the current time so as to enable the computing subsystem CS2 to verify if the initiation key identified by the key identifier KeyID is valid for the current time. This constitutes an additional verification step on the receiving, i.e., non-initializing, end of the key agreement procedure. When the initiation key identified by the key identifier KeyID is available to the computing subsystem CS2 and if usage of the initiation key is still allowed, e.g., in case its usage count is still above zero, the computing subsystem CS2 generates, in a step titled CALC_RESP1_STEP, a random RND2 and a session key $SK_A$ for the authentication. The computing subsystem CS2 further calculates a response to the challenge from the first mobile device MD1, being indicated as $E\_SK_A(X)$ with $X=RND1\|RND2\|ID2$. Here, the $E\_SK_A$ denotes an encryption function that uses $SK_A$ as the session key and X as the message. An example of such a function is a Message Authentication Code (MAC).

5. The computing subsystem CS2 provides $E\_SK_A(X)$ and the random RND2 to the mobile subsystem MS2 of the second mobile device MD2.

6. The second mobile device MD2 sends $E\_SK_A(X)$, the random RND2 and the identifier ID2 to the first mobile device MD1, constituting a response to step 3.

7. The first mobile device MD1 requests its computing subsystem CS1 to authenticate the response received from the second mobile device MD2 and to generate a response to the challenge provided in the form of RND2.

8. In a step titled CALC_RESP2_STEP, the computing subsystem CS1 generates a session key for authentication of $SK_A$, and checks the response $E\_SK_A(X)$ from the second mobile device MD2. The computing subsystem CS1 then calculates a response to the challenge from the second mobile device MD2, being indicated by $E\_SK_A(Y)$ with $Y=Rnd2\|RND1\|ID1$. The computing subsystem CS1 generate a session key for use in the D2D communication session $SK_C$, and optionally a session key for integrity protection $SK_I$. The computing subsystem CS1 may then adjust, e.g., decrease, the usage count of the initiation key. Finally, the computing subsystem CS1 provides $E\_SK_A(Y)$, the session key $SK_C$, and optionally $SK_I$, to the mobile subsystem MS1.

9. The first mobile device MD1 sends a response to the challenge from the second mobile device MD2 in the form of $E\_SK_A(Y)$ to the second mobile device MD2.

10. In response, the second mobile device MD2 requests its computing subsystem CS2 to check, i.e., authenticate, $E\_SK_A(Y)$.

11. The computing subsystem CS2 then determines, in a step titled CALC_SESSIONKEY_STEP, if $E\_SK_A(Y)$ is valid, and if so generates the session key $SK_C$, and optionally $SK_I$, and provides both to the mobile subsystem MS2. The computing subsystem CS2 may then adjust, e.g., decrease, the usage count of the initiation key.

12. The mobile subsystem MS2 of the second mobile device MD2 establishes the D2D communication session with the mobile subsystem MS1 of the first mobile device MD1 using the session key $SK_C$. Hence, a secure D2D communication session is obtained.

FIG. 8 shows an alternative 168 to the key agreement procedure 166 as shown in FIG. 7. A difference concerns that here, the identifiers ID1 and ID2 are encrypted during exchange, whereas in the key agreement procedure of FIG. 7, the identifiers ID1 and ID2 were exchanged without being encrypted. By encrypting the identifiers ID1 and ID2 during exchange, it may be prevented that users are tracked and/or identified through eavesdropping of the message exchange between the mobile devices MD1, MD2.

The further steps shown in FIG. 8 may be explained as follows. Here, the numerals correspond to those shown in FIG. 8.

1. Step 1 corresponds to step 1 as discussed in reference to FIG. 7, with the addition that the computing subsystem CS1 generates a challenge, being essentially a message that is encrypted using the initiation key, the encrypted message being denoted by E_MK, and the encrypted message comprising the random RND1 and the identifier ID1.

2. The computing subsystem CS1 provides the key identifier KeyID and the challenge to the mobile subsystem MS1 of the first mobile device MD1.

3. The first mobile device MD1 sends the key identifier KeyID, the challenge to the second mobile device MD2 over the D2D communication channel DDC so as to initialize the key agreement procedure.

4. In response, the second mobile device MD2 requests its computing subsystem CS2 to initiate the key agreement procedure. For that purpose, it provides the key identifier KeyID, the challenge to the computing subsystem CS2. In addition, the computing subsystem CS2 may request the second mobile device MD2 to provide the current time so as to enable the computing subsystem CS2 to verify if the initiation key identified by the key identifier KeyID is valid for the current time. This constitutes an additional verification step on the receiving, i.e., non-initializing, end of the key agreement procedure. When the initiation key identified by the key identifier KeyID is available to the computing subsystem CS2 and if usage of the initiation key is still allowed, e.g., in case its usage count is still above zero, the computing subsystem CS2 generates, in a step titled CALC_RESP1_STEP, a random RND2 and a session key SKA for the authentication. The computing subsystem CS2 further calculates a response to the challenge from the first mobile device MD1, being indicated as $E\_SK_A(X)$ with $X=RND1\|RND2\|ID2$. Here, the E_SKA denotes an encryption function that uses SKA as the session key and X as the message. An example of such a function is a Message Authentication Code (MAC). The computing subsystem CS2 also calculates a challenge, $E\_MK(RND2\|ID2)$, for which the same E_MK is used that the computing subsystem CS1 of the first mobile device MD1 used in its challenge.

5. The computing subsystem CS2 provides $E\_SKA(X)$ and the challenge to the mobile subsystem MS2 of the second mobile device MD2.

6. The second mobile device MD2 sends $E\_SK_A(X)$ and the challenge to the first mobile device MD1, constituting a response to step 3.

7. The first mobile device MD1 requests its computing subsystem CS1 to authenticate the response received from the second mobile device MD2 and to generate a response to the challenge provided in the form of $E\_MK(RND2\|ID2)$.

8-12. Steps 8-12 correspond to steps 8-12 as discussed in reference to FIG. 7.

It is noted that in general, a computing subsystem of a mobile device may request a further initiation key via the mobile network if i) no initiation key is deemed valid, or ii) the key agreement procedure fails in providing the session key.

It will be appreciated that the present invention may be advantageously applied to Direct LTE, i.e., LTE-based D2D communication between mobile devices. In particular, the present invention allows the following advantageous uses.

Corporation X has purchased a direct mode subscription from operator Y for all its employees. As a result, for example once a week during the night or during low network load, all mobile devices of the corporation, such as mobile phones and dongles, are provided with a set of a hundred initiation keys which are valid for every day of the following week. On a next Monday, several employees have a meeting in which they would like to share a presentation. However, they are located in a meeting room without network coverage, i.e., are outside a range of the mobile network. They plug-in their dongles into their laptops and setup an ad hoc network based on Direct LTE. Since all dongles were provided with a same set of initiation keys, the employees are able to setup a LTE-based D2D communication session in the meeting room without needing to access the mobile network.

Another advantageous use may be the following. Again, corporation X has purchased a direct mode subscription. Again, for example once a week during the night or during low network load, all mobile devices of the corporation are provided with a set of a hundred initiation keys which are valid for every day of the following week. However, one dongle was turned off during said preloading procedure. On a next Monday, several employees have a meeting in which they would like to share a presentation. They are located in a room with network coverage. They plug-in their dongles into their laptops and setup an ad hoc network based on Direct LTE. Because most of the dongles were provided with a same set of initiation keys, the employees are able to setup a LTE-based D2D communication session in the meeting room without needing to access the mobile network. However, the dongle which was turned off during the preloading procedure can still join the D2D communication session by requesting from the mobile network the set of initiation keys, and once said set has been provided, the dongle joins the D2D communication session.

Another advantageous use may be the following, which is a same as the aforementioned use, except that the employees are located in a room with network coverage. They plug-in their dongles into their laptops and setup an ad hoc network based on Direct LTE. Some dongles already have keys available for the D2D communication session, but some only have expired keys, e.g., because D2D communication hasn't been used for some time and therefore no initiation keys needed to be preloaded or updated. All dongles now request from the mobile network a set of initiation keys and once said set has been provided, each dongle joins the D2D communication session. Later that day, the employees meet again. Now, a D2D communication session can be established immediately, i.e., without a need to contact the mobile network, since the dongles now already have a set of valid initiation keys.

Yet another advantageous use may the following. For emergency services, it is of utmost importance to be able to communicate at all times. Hence, a mobile device which relies on network coverage to establish a D2D communication session may not be desirable. This may be avoided by preloading initiation keys frequently, e.g., every time when a mobile device is switched on, and/or by preloading initiation keys which are associated with a validity period that is relatively long. The preloading may also occur every night, when all the mobile devices are at a central location. During the day, the firefighters, policemen and ambulance personnel can choose direct mode operation in case network reception is inadequate, thereby still allowing communication amongst said emergency service personnel.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. Method for a mobile device to establish a device-to-device (D2D) communication session with a further mobile device, the mobile device being connectable via a D2D communication channel to the further mobile device and the mobile device being connectable to a mobile network, comprising:
    preloading an initiation key on the mobile device, the initiation key being associated with a validity period; and
    on each of the mobile devices:
    verifying a validity of the initiation key based on a current time;
    if the initiation key is deemed valid, generating a session key using the initiation key by using the initiation key in performing a key agreement procedure with the further mobile device over the D2D communication channel, the key agreement procedure resulting in the session key if the initiation key used by the mobile device matches an initiation key used by the further mobile device; and
    establishing the D2D communication session over the D2D communication channel based on the session key.

2. Method according to claim 1, wherein the preloading the initiation key comprises providing the initiation key to the mobile device via the mobile network when the mobile device is connected to the mobile network.

3. Method according to claim 1, wherein the preloading the initiation key comprises storing the initiation key in a secure storage area of the mobile device.

4. Method according to claim 3, wherein the secure storage area is provided by a trusted computing subsystem of the mobile device.

5. Method according to claim 4, wherein at least one of the group of: verifying the validity of the initiation key, and using the initiation key in performing the key agreement procedure, is performed by the trusted computing subsystem.

6. Method according to claim 1, further comprising:
    preloading a set of initiation keys on the mobile device, the set of initiation keys key being associated with a respective set of validity periods; and
    performing a key synchronization procedure with the further mobile device over the D2D communication channel for selecting a matching one of the set of initiation keys on the mobile device as the initiation key.

7. Method according to claim 6, further comprising:
    preloading a set of key identifiers on the mobile device, each of the set of key identifiers identifying a respective one of the set of initiation keys; and
    performing the key synchronization procedure based on an exchange of one or more of the set of key identifiers with the further mobile device.

8. Method according to claim 6, further comprising disabling or removing the initiation key from the set of initiation keys after use in establishing the D2D communication session.

9. Method according to claim 6, wherein the set of validity periods is constituted at least in part by different but overlapping validity periods.

10. Method according to claim 1, wherein the initiation key is associated with a virtual network identity, and wherein the verifying the validity of the initiation key further comprises determining a match of the virtual network identity on the mobile device via the D2D communication channel.

11. Method according to claim 1, wherein the initiation key is associated with a usage count for limiting a number of uses of the initiation key, and wherein the verifying the validity of the initiation key is further based on the usage count.

12. Method according to claim 11, further comprising adjusting the usage count after use of the initiation key in establishing the D2D communication session.

13. Method according to claim 1, further comprising requesting a further initiation key via the mobile network (MN) if i) no initiation key is deemed valid, or ii) the key agreement procedure fails in providing the session key.

14. Method according to claim 1, wherein the key agreement procedure comprises:
 a three-pass authentication procedure; or
 a use of the initiation key to encrypt a message exchange between the mobile devices for obtaining a shared secret, and a Diffie-Hellman key exchange procedure which is initiated based on the shared secret.

15. A non-transitory computer-readable medium configured to store instructions for, upon execution of the instructions on a mobile device, causing the mobile device to establish a device-to-device (D2D) communication session with a further mobile device, the mobile device being connectable to the further mobile device via a D2D communication channel and the mobile device being connectable to a mobile network, by:
 storing an initiation key which is provided during a preloading procedure, the initiation key being associated with a validity period;
 verifying a validity of the initiation key based on a current time;
 if the initiation key is deemed valid, generating a session key using the initiation key by using the initiation key in performing a key agreement procedure with the further mobile device over the D2D communication channel, the key agreement procedure resulting in the session key if the initiation key used by the mobile device matches an initiation key used by the further mobile device; and
 establishing the D2D communication session over the D2D communication channel based on the session key.

16. Mobile device for establishing a device-to-device (D2D) communication session with a further mobile device, the mobile device being connectable to the further mobile device via a D2D communication channel and the mobile device being connectable to a mobile network, the mobile device comprising:
 a storage area for storing an initiation key which is provided during a preloading procedure, the initiation key being associated with a validity period; and
 a computing subsystem for:
  verifying a validity of the initiation key based on a current time;
  if the initiation key is deemed valid, generating a session key using the initiation key by using the initiation key in performing a key agreement procedure with the further mobile device over the D2D communication channel, the key agreement procedure resulting in the session key if the initiation key used by the mobile device matches an initiation key used by the further mobile device; and
 a mobile subsystem for establishing the D2D communication session over the D2D communication channel based on the session key.

17. Mobile network arranged for preloading an initiation key on a mobile device when the mobile device is connected to the mobile network, the initiation key being associated with a validity period, the mobile device for establishing a device-to-device (D2D) communication session with a further mobile device, the mobile device being connectable to the further mobile device via a D2D communication channel and the mobile device being connectable to the mobile network, the mobile device comprising:
 a storage area for storing an initiation key which is provided during a preloading procedure, the initiation key being associated with a validity period; and
 a computing subsystem for:
  verifying a validity of the initiation key based on a current time;
  if the initiation key is deemed valid, generating a session key using the initiation key by using the initiation key in performing a key agreement procedure with the further mobile device over the D2D communication channel, the key agreement procedure resulting in the session key if the initiation key used by the mobile device matches an initiation key used by the further mobile device; and
 a mobile subsystem for establishing the D2D communication session over the D2D communication channel based on the session key.

* * * * *